(12) United States Patent
Dasgupta

(10) Patent No.: US 9,015,452 B2
(45) Date of Patent: Apr. 21, 2015

(54) VECTOR MATH INSTRUCTION EXECUTION BY DSP PROCESSOR APPROXIMATING DIVISION AND COMPLEX NUMBER MAGNITUDE

(75) Inventor: Udayan Dasgupta, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 685 days.

(21) Appl. No.: 12/708,180

(22) Filed: Feb. 18, 2010

(65) Prior Publication Data

US 2010/0211761 A1   Aug. 19, 2010

Related U.S. Application Data

(60) Provisional application No. 61/153,458, filed on Feb. 18, 2009.

(51) Int. Cl.
 G06F 9/302 (2006.01)
 G06F 9/30 (2006.01)
 G06F 9/38 (2006.01)
 G06F 7/48 (2006.01)
 G06F 7/535 (2006.01)
 G06F 7/548 (2006.01)
 G06F 7/552 (2006.01)

(52) U.S. Cl.
 CPC ........ *G06F 9/30014* (2013.01); *G06F 9/30036* (2013.01); *G06F 9/30065* (2013.01); *G06F 9/3887* (2013.01); *G06F 9/3891* (2013.01); *G06F 7/4806* (2013.01); *G06F 7/535* (2013.01); *G06F 7/548* (2013.01); *G06F 7/552* (2013.01); *G06F 2207/3828* (2013.01); *G06F 2207/5354* (2013.01); *G06F 2207/5525* (2013.01)

(58) Field of Classification Search
 CPC ........... G06F 9/30036; G06F 9/30014; G06F 9/3885; G06F 9/30109; G06F 15/8053; G06F 9/30112; G06F 9/345; G06F 7/24; G06F 7/32; G06F 7/36
 USPC ................................. 712/E9.071, 222, 300, 4
 See application file for complete search history.

(56) References Cited

U.S. PATENT DOCUMENTS 4,481,600 A * 11/1984 Asai ............................. 708/654
5,745,721 A *  4/1998 Beard et al. ................... 712/208
5,933,650 A *  8/1999 van Hook et al. ................. 712/2

(Continued)

OTHER PUBLICATIONS

TMS320C64x/C64x+ DSP CPU and Instruction Set Reference Guide, Texas Instruments, Literature No. SPRU732H, Oct. 2008.

(Continued)

*Primary Examiner* — Kenneth Kim

(74) *Attorney, Agent, or Firm* — Robert B. Marshall, Jr.; Frank D. Cimino

(57) ABSTRACT

A digital signal processor (DSP) includes an instruction fetch unit, an instruction decode unit, a register set and a plurality of work units in communication with the instruction decode unit. A first embodiment calculates two divisions on packed numerators and packed denominators. The DSP work units calculate indexes into a 1/d look-up table and make a final sign correction. A second embodiment calculates an approximation of a vector magnitude of a complex number x+jy. The approximation is based upon $\sqrt{(x^2+y^2)} \approx \alpha^* \max(|x|, |y|) + \beta^* \min(|x|, |y|)$. The DSP work units calculate the absolute values, find the maxima and minima, and form the packed results of two vector magnitude calculations.

9 Claims, 7 Drawing Sheets

(56) References Cited

U.S. PATENT DOCUMENTS

| | | | | |
|---|---|---|---|---|
| 5,936,872 | A | * | 8/1999 | Fischer et al. ............... 708/622 |
| 6,047,304 | A | * | 4/2000 | Ladwig et al. ............... 708/530 |
| 6,714,197 | B1 | * | 3/2004 | Thekkath et al. ............. 345/427 |
| 7,120,781 | B1 | * | 10/2006 | Kolagotla et al. ............. 712/223 |
| 7,620,797 | B2 | * | 11/2009 | Gonion et al. ................ 712/204 |
| 8,655,937 | B1 | * | 2/2014 | Vanderspek .................. 708/650 |
| 2006/0094973 | A1 | * | 5/2006 | Drew ............................ 600/544 |
| 2009/0089346 | A1 | * | 4/2009 | Bailey et al. .................. 708/204 |
| 2009/0177723 | A1 | * | 7/2009 | Tsai .............................. 708/201 |

OTHER PUBLICATIONS

TMS320C6000 Programmers Guide, Texas Insbuments, Literature No. SPRU1981, Mar. 2006.

Granston, Elana, Hand Tuning loops and control code on the TMS320C6000, Application report, Texas Instruments, Literature No. SPRA666, Aug. 2006.

Shima, J. M., "FM demodulation using digital radio and digital signal processing", MS Thesis, University of Florida, 1995.

DSP Tricks on dspguru, Found At: http://www.dspguru.com/dsp/tricks/magnitude-estimator.

* cited by examiner

VECTOR MATH INSTRUCTION EXECUTION BY DSP PROCESSOR APPROXIMATING DIVISION AND COMPLEX NUMBER MAGNITUDE

CROSS-REFERENCE TO RELATED APPLICATIONS

This application is a non-provisional application claiming priority to provisional application Ser. No. 61/153,458, filed on Feb. 18, 2009, entitled "Low Complexity Vectorized Mathematical Functions On Texas Instruments' C64x+™ Platforms", the teachings of which are incorporated by reference herein.

BACKGROUND

A large variety of algorithms need to use specialized mathematical functions, like sin( ), cos( ), a tan( ), and div( ), for their implementation. Some platforms provide special hardware blocks for these functions while other platforms do not have such hardware accelerators and need to implement this functionality in software. The complexity of these software implementations become especially important if these functions need to be called repeatedly in a loop. Also, some applications need high precision versions of these functions while other applications can tolerate approximations.

SUMMARY

In accordance with at least some embodiments, a digital signal processor (DSP) includes an instruction fetch unit and an instruction decode unit in communication with the instruction fetch unit. The DSP also includes a register set and a plurality of work units in communication with the instruction decode unit. A vector math instruction decoded by the instruction decode unit causes input vectors and output vectors to be aligned with a maximum boundary of the register set and causes parallel operations by the work units.

In at least some embodiments, a method for a digital signal processor (DSP) with a register set and work units is provided. The method includes decoding a vector math instruction. In response to decoding the vector math instruction, the method aligns input vectors and output vectors with a maximum boundary of the register set. Further, in response to decoding the vector math instruction, the method performs parallel operations with the register set and work units to complete a math function.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
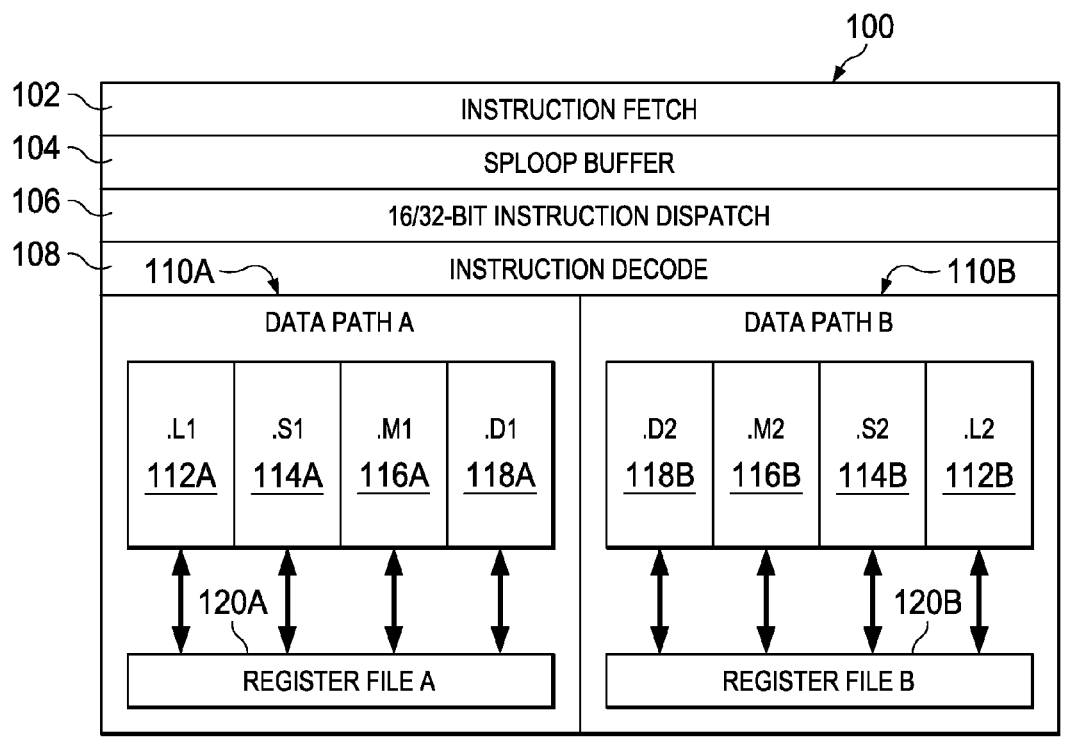
FIG. 1 illustrates a digital signal processor (DSP) core architecture in accordance with an embodiment of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure are directed to techniques for improving the efficiency of vectorized mathematical functions on a digital signal processor (DSP) with a register set and a plurality of work units. In at least some embodiments, a decoded vector math instruction causes input vectors and output vectors to be aligned with a maximum boundary of the DSP register set and causes parallel operations by DSP work units. The vectorized mathematical functions may be approximations that simplify the DSP operations and/or enable parallel operations. The techniques described herein were developed for Texas Instrument's C64x+™ DSP core, but are not limited to any particular DSP. Rather, the techniques described herein may be utilized to improve the efficiency of vectorized mathematical functions for any digital signal processor (DSP) with features a register set and work units.

In accordance with at least some embodiments, vectorized, low-precision, low-complexity versions of a division function, an A tan 2 function, and a complex magnitude function are provided for a DSP. These functions are mapped herein to the C64x+™ DSP core, but are not limited to a particular DSP. The performance of the functions will also be described herein in terms of cycle-performance and the normalized maximum absolute error (NMAE). The division function is referred to herein as "div_lp__16b__16b" to indicate that it is a low-precision division function that operates on 16-bit inputs to produce 16-bit results. The A tan 2 function is referred to herein as "a tan 2_lp__16b__16b" to indicate that it is a low-precision function to compute the four-quadrant inverse tangent and it operates on 16-bit inputs to produce 16-bit results. The complex magnitude function is referred to herein as "cplxMag_lp_16b_16b" to indicate that it is low-precision function to compute the magnitude of a complex number and it operates on 16-bit inputs to produce 16-bit results.

It should be noted that the mathematical notation herein uses upper case letters to represent vectors while lower case counterparts represent elements in that vector. For example, x represents elements in vector X (i.e., X={x}). Also, subscripts used with a vector indicates its length, while subscripts used with its elements indicate their index (position) in the vector (e.g., $x_l$ represents the $l^{th}$ element in $X_L$, which is a vector of length L).

FIG. 1 illustrates a digital signal processor (DSP) core architecture 100 in accordance with embodiments of the disclosure. The DSP architecture 100 corresponds to the C64x+™ DSP core, but may also correspond to other DSP cores as well. As shown in FIG. 1, the DSP core architecture 100 comprises an instruction fetch unit 102, a software pipeline loop (SPLOOP) buffer 104, a 16/32-bit instruction dispatch unit 106, and an instruction decode unit 108. The instruction fetch unit 102 is configured to manage instruction fetches from a memory (not shown) that stores instructions for use by the DSP core architecture 100. The SPLOOP buffer 104 is configured to store a single iteration of a loop and to selectively overlay copies of the single iteration in a software pipeline manner. The 16/32-bit instruction dispatch unit 106 is configured to split the fetched instruction packets into execute packets, which may be one instruction or multiple parallel instructions (e.g., two to eight instructions). The 16/32-bit instruction dispatch unit 106 also assigns the instructions to the appropriate work units described herein. The instruction decode unit 108 is configured to decode the source registers, the destination registers, and the associated paths for the execution of the instructions in the work units described herein.

In accordance with C64x+ DSP core embodiments, the instruction fetch unit 102, 16/32-bit instruction dispatch unit 106, and the instruction decode unit 108 can deliver up to eight 32-bit instructions to the work units every CPU clock cycle. The processing of instructions occurs in each of two data paths 110A and 110B. As shown, the data path A 110A comprises work units, including a L1 unit 112A, a S1 unit 114A, a M1 unit 116A, and a D1 unit 118A, whose outputs are provided to register file A 120A. Similarly, the data path B 110B comprises work units, including a L2 unit 112B, a S2 unit 114B, a M2 unit 116B, and a D2 unit 118B, whose outputs are provided to register file B 120B.

In accordance with C64x+ DSP core embodiments, the L1 unit 112A and L2 unit 112B are configured to perform various operations including 32/40-bit arithmetic operations, compare operations, 32-bit logical operations, leftmost 1 or 0 counting for 32 bits, normalization count for 32 and 40 bits, byte shifts, data packing/unpacking, 5-bit constant generation, dual 16-bit arithmetic operations, quad 8-bit arithmetic operations, dual 16-bit minimum/maximum operations, and quad 8-bit minimum/maximum operations. The S1 unit 114A and S2 unit 114B are configured to perform various operations including 32-bit arithmetic operations, 32/40-bit shifts, 32-bit bit-field operations, 32-bit logical operations, branches, constant generation, register transfers to/from a control register file (the S2 unit 114B only), byte shifts, data packing/unpacking, dual 16-bit compare operations, quad 8-bit compare operations, dual 16-bit shift operations, dual 16-bit saturated arithmetic operations, and quad 8-bit saturated arithmetic operations. The M unit 116A and M unit 116B are configured to perform various operations including 32×32-bit multiply operations, 16×16-bit multiply operations, 16×32-bit multiply operations, quad 8×8-bit multiply operations, dual 16×16-bit multiply operations, dual 16×16-bit multiply with add/subtract operations, quad 8×8-bit multiply with add operation, bit expansion, bit interleaving/de-interleaving, variable shift operations, rotations, and Galois field multiply operations. The D unit 118A and D unit 118B are configured to perform various operations including 32-bit additions, subtractions, linear and circular address calculations, loads and stores with 5-bit constant offset, loads and stores with 15-bit constant offset (the D2 unit 118B only), load and store doublewords with 5-bit constant, load and store nonaligned words and doublewords, 5-bit constant generation, and 32-bit logical operations. Each of the work units reads directly from and writes directly to the register file within its own data path. Each of the work units is also coupled to the opposite-side register file's work units via cross paths. For more information regarding the architecture of the C64x+ DSP core and supported operations thereof, reference may be had to Literature Number: SPRU732H, "TMS320C64x/C64x+ DSP CPU and Instruction Set", October 2008, which is hereby incorporated by reference herein.

Figure 2A:
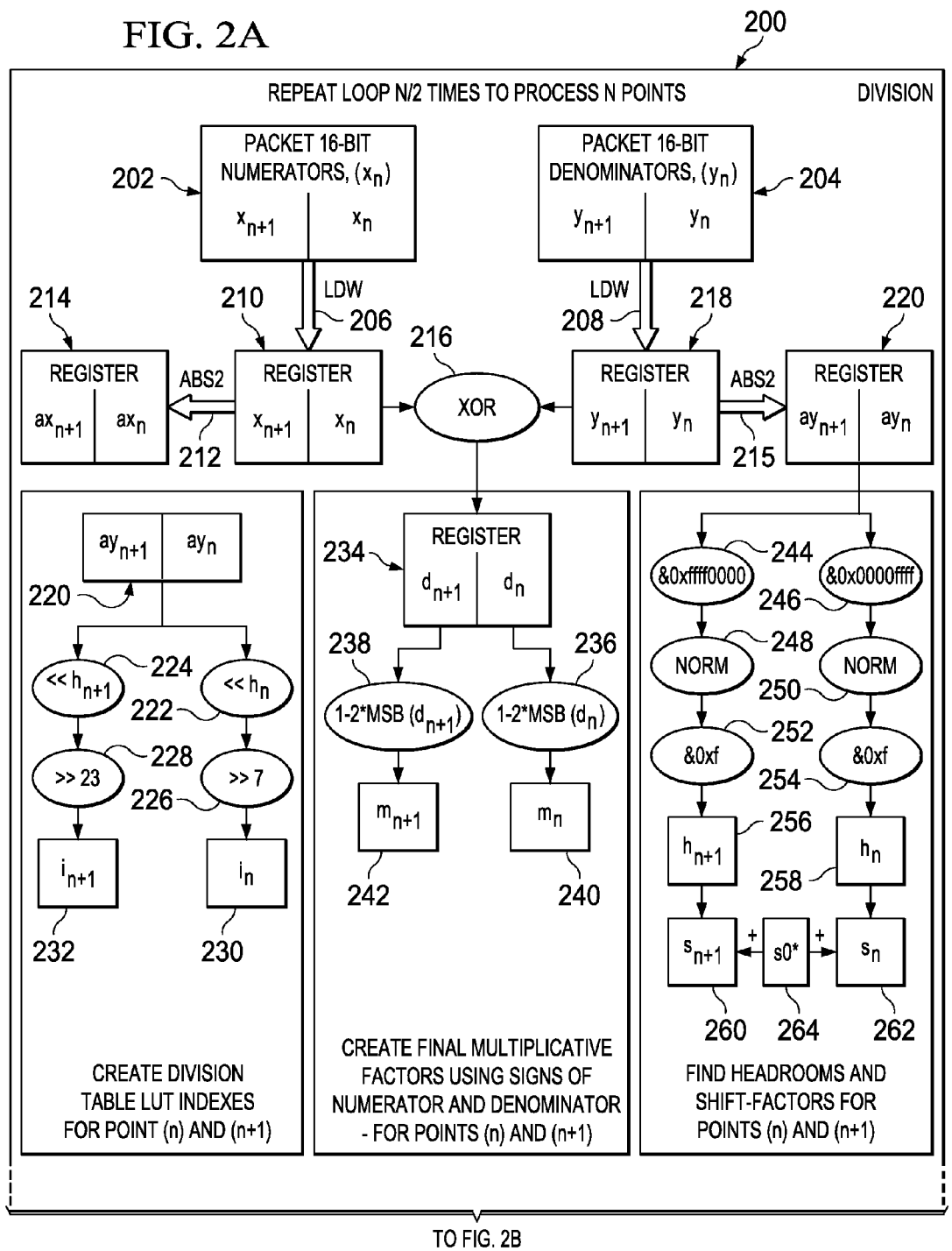
FIGS. 2A-2B illustrate a division algorithm for the DSP core architecture of FIG. 1 in accordance with an embodiment of the disclosure.
Figure 2B:
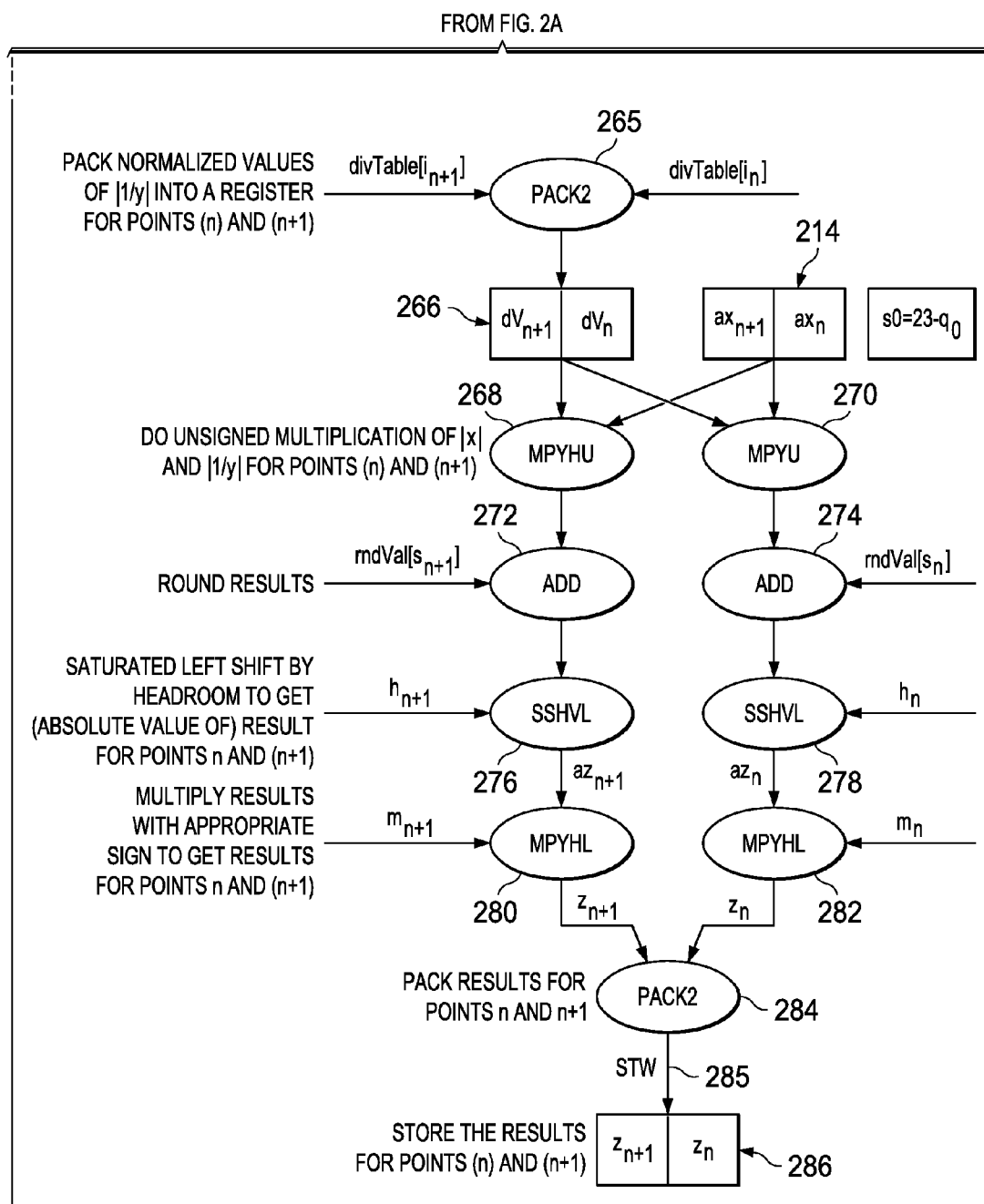

FIGS. 2A-2B illustrate a division algorithm (div_lp_16b_16b) 200 for the DSP core architecture 100 of FIG. 1 in accordance with an embodiment of the disclosure. In vectorized division, for each element in the input vectors containing the input numerators, $N_L=\{n_l\}$, and denominators, $D_L=\{d_l\}$, the division result, $R_L=\{r_l\}$ is given by, $$r_l = \frac{n_l}{d_l}, \text{ where } 0 \le l \le (L-1)$$

There are various ways to approximate this result. One method would be to use a repeated subtract-and-compare approach. Although such a method would be very accurate, it would need several iterations and thereby would need several cycles on a DSP. Another approach would be to use a look-up table (LUT) to determine $$\frac{1}{d_l},$$

and then multiply this value by $n_l$ to determine $r_l$. A small LUT is sufficient for applications that are able to tolerate a moderate precision. In accordance with at least some embodiments, an LUT method is used for the division algorithm 200. In such embodiments, the LUT is assumed to contain the values in unsigned Qx.y format (denoted as UQx.y). Assuming that $n_l$, $d_l$, $$\frac{1}{d_l}$$

and $r_l$ are all 16-bit numbers, $r_l$ maintains user-defined q fractional bits, and the LUT is of length $2^K$. The computation steps (in fixed point) for the division algorithm 200 are given as,

| | |
|---|---|
| h = norm($d_l$); | where $0 \le l \le (L-1)$, h = 0, ... 15 |
| a = \|$n_l$\|, b = \|$d_l$\|; | where $0 \le l \le (L-1)$ |
| i = (b << h) >> (15 − K); | where $0 \le l \le (L-1), 0 \le i \le (2L-1)$ |

-continued

```
i = min(i, 2^K);
g = (32 - y - q - h);           where 0 ≤ q ≤ 15, 0 ≤ y ≤ 15
rndC = 1 << g;
w = (LUT[i]*a+ rndC) >> g;
w = min(MAX_INT16, w);          // Saturate w
rl = w*sign(n_i)*sign(d_i);
```

Note that the function "norm" is assumed to return the number of unused bits in the fixed point number.

In FIGS. 2A-2B, the division algorithm 200 is repeated N/2 times to process N points. As shown in 2A, packed 16-bit numerators ($x_n$ and $x_{n+1}$) 202 and packed 16-bit denominators ($y_n$ and $y_{n+1}$) 204 are loaded into 32-bit registers 210 and 218 respectively. Such numerators and denominators may be pre-packed in memory and the loading operations 206 and 208 are performed by at least one D unit (e.g., the D unit 118A and/or the D unit 118B). In the division algorithm 200, the packed numerators in the register 210 are accessed and their absolute value is determined using an ABS2 operation 212 performed by at least one L unit (e.g., the L unit 112A and/or the L unit 112B). The results of the ABS2 operation 212 are stored in a 32-bit register 214.

Further, in the division algorithm 200, the packed denominators in the register 218 are accessed and their absolute value is determined by an ABS2 operation 215 performed by at least one L unit (e.g., the L unit 112A and/or the L unit 112B). The results of the ABS2 operation 215 are stored in a 32-bit register 220. The absolute values of the denominators are accessed from the register 220 and are shifted by operations 222, 224, 226, 228 to create division table LUT indexes ($i_{n+1}$ and $i_n$). The shift operations 222, 224, 226, 228 are performed by at least one S unit (e.g., the S unit 114A and/or the S unit 114B). As shown, the shift operations 224 and 228 may be performed in parallel with the shift operations 222 and 226 to determine $i_{n+1}$ and $i_n$.

Further, the absolute values of the denominators are accessed from the register 220 to determine headrooms ($h_n$ and $h_{n+1}$) 256, 258 and shift-factors ($s_n$ and $s_{n+1}$) 260, 262 for points n and n+1. The "& 0xffff0000" operation 244 allows the top 16 bits (containing $ay_{n+1}$) to be isolated while the "& 0x0000ffff" operation 246 isolates the bottom 16 bits (containing $ay_n$). Once the two 16-bit numbers are isolated, the headroom on these numbers ($h_{n+1}$ and $h_n$) are determined by NORM operations 248 and 250, which return the headroom in a 32-bit input. Masking operations (& 0xf) 252 and 254 are used so that only the bottom 4 bits of the NORM result is used to determine the number of unused headroom bits in the 16-bit numbers ($ay_{n+1}$ and $ay_n$). After the headrooms are determined, the corresponding shift factors ($s_{n+1}$ and $s_n$) are computed as $s_{n+1}=h_{n+1}+(23-q_0)$ and $s_n=h_n+(23-q_0)$. For the division algorithm 200, $s0=(23-q_0)$. The NORM and masking operations are implemented to track shifting factors that enable the division LUT indexes to have less precision than the points being operated on. As shown, the operations 224, 248, 252 may be performed in parallel with the operations 246, 250, 254 to determine $s_n$ and $s_{n+1}$1.

Further, in the division algorithm 200, the packed numerators ($x_n$ and $x_{n+1}$) and denominators ($y_n$ and $y_{n+1}$) are accessed from registers 210 and 218 and are XOR'd with the result ($d_n$ and $d_{n+1}$) of the XOR operation 216 being stored in a 32-bit register 234. The XOR operation 216 is performed by at least one L unit, S unit, or D unit. The values $d_n$ and $d_{n+1}$ are then operated on to create multiplicative factors ($m_n$ and $m_{n+1}$) using the signs of the numerator and denominator for points n and n+1. If both the numerator and denominator ({$x_n$, $y_n$} or {$x_{n+1}$, $y_{n+1}$}) have the same sign, the most significant bit of the XOR results, represented as MSB($d_n$) and MSB($d_{n+1}$), will be 0. If the numerator and denominator have opposite signs, the most significant bit of the XOR result will be 1. In the division algorithm 200, the operations 238 and 236 ($m_n=1-2$*MSB($d_n$)) enable the XOR results to be converted to the appropriate sign for the division result. Thus, if {$x_n$, $y_n$} or {$x_{n+1}$, $y_{n+1}$} have the same sign, the XOR result will be 0 and m=1, indicating that the final division result should be multiplied by +1. If {$x_n$, $y_n$} or {$x_{n+1}$, $y_{n+1}$} have different signs, the XOR result will be 1 and m=−1, indicating that the final division result should be multiplied by −1. As shown, the operation 238 may performed in parallel with operation 236 to determine $m_n$ and $m_{n+1}$.

In FIG. 2B of the division algorithm 200, the normalized values of 1/y are packed into a register 266 for points n and n+1 by a PACK2 operation 265, where the packed values are labeled $dV_n$ and $dV_{n+1}$. As previously mentioned, packing operations are performed by at least one L unit or S unit. Unsigned multiplication of x (accessed from register 214) and 1/y (accessed from register 266) is then performed for points n and n+1 by multiply operations 268 and 270. In at least some embodiments, the unsigned multiplication corresponds to MPYHU and MPYU operations performed by at least one M unit (e.g., the M unit 116A and/or the M unit 116B). The results of the unsigned multiplications are rounded by adding (ADD operations 272 and 274) a round value (mdVal). The ADD operations 272 and 274 may be performed by at least one D unit, L unit, or S unit. A saturated left shift by the headroom values (previously determined) are performed on the rounded results to determine the absolute value for points n and n+1. In at least some embodiments, the shifts correspond to SSHVL operations 276 and 278 performed by at least one M unit. The shifted values are multiplied by the appropriate sign (previously determined) to obtain a result for points n and n+1. In at least some embodiments, this multiplication corresponds to MPYHL operations 280 and 282 performed by at least one M unit. The results ($z_n$ and $z_{n+1}$) are packed using a PACK2 operation 284 performed by at least one L unit or S unit. Finally, a store word operation (STW) 285 is used to store the packed results to a 32-bit register 286. The STW operation 285 is performed by at least one D unit. As shown, the operations 268, 272, 276, 280 are performed in parallel with the operations 270, 274, 278, 282 to determine z and z+1.

To summarize, several optimization techniques may be implemented when the division algorithm 200 is mapped to the C64x+ core. For example, to facilitate use of wide load and store instructions, all input and output vectors may be aligned on 64-bit boundaries. Further, the loop may be unrolled 2 or 4 times. Further, wide load instructions (LDW or LDDW) may be used for loading the numerator and denominator, and wide store instructions (STW or STDW) may be used to store the results. Further, absolute values of two numerators and denominators may be simultaneously found using ABS2 intrinsics. Further, if packed versions of two numerators (16-bits each) and two denominators (16-bits each) are available, the numerators and denominators can be xor'd in a single cycle to determine the sign of the result. A "1" in bit-15 (and bit-31) would indicate a negative result for the lower (and upper) half word, while a "0" would indicate a positive result. Further, computing $m_0=1-2b_0$ and $m_1=1-2b_1$ and converting the sign bit with value 1/0 to a 16-bit representation of −1 or +1 may be used as a scale factor later. Note that the values of b0 (bit-15) and b1 (bit-31) need to be extracted (e.g., by EXTU intrinsics) from this xor'd result before the scale factor can be generated. Further, the headroom in the numerator and denominator can be found using the NORM intrinsic. Assuming the use of an 8-bit division table, the table index may be found by using the most significant 8 bits (after ignoring the headroom bits). Further, two consecutive values of $(1/d_1)$ can be looked up from the table, multiplied with the corresponding numerators, and rounded. The rounding value, which may correspond to one of 16 possible values since the shifts are always less than 16, may also be looked up from the small LUT in order to move complexity from S units to D units, since the division algorithm 200 is S unit limited. Further, the results of the division need to be shifted appropriately, multiplied by $m_0$ and $m_1$, and packed and stored with wide-store instructions. Note that the shift in this case may be accomplished using SSHVL instructions which moves complexity from S units to M units. The performance results of the division algorithm 200 mapped to the C64x+ core were found to be 4 cycles (in terms of cycles per output point using C+ intrinsics code) and the NMAE (with respect to floating point implementation) was found to be less than 10%. Implementation achieves pipelined performance of 4 cycles/output for the C64x+ core.

Figure 3A:
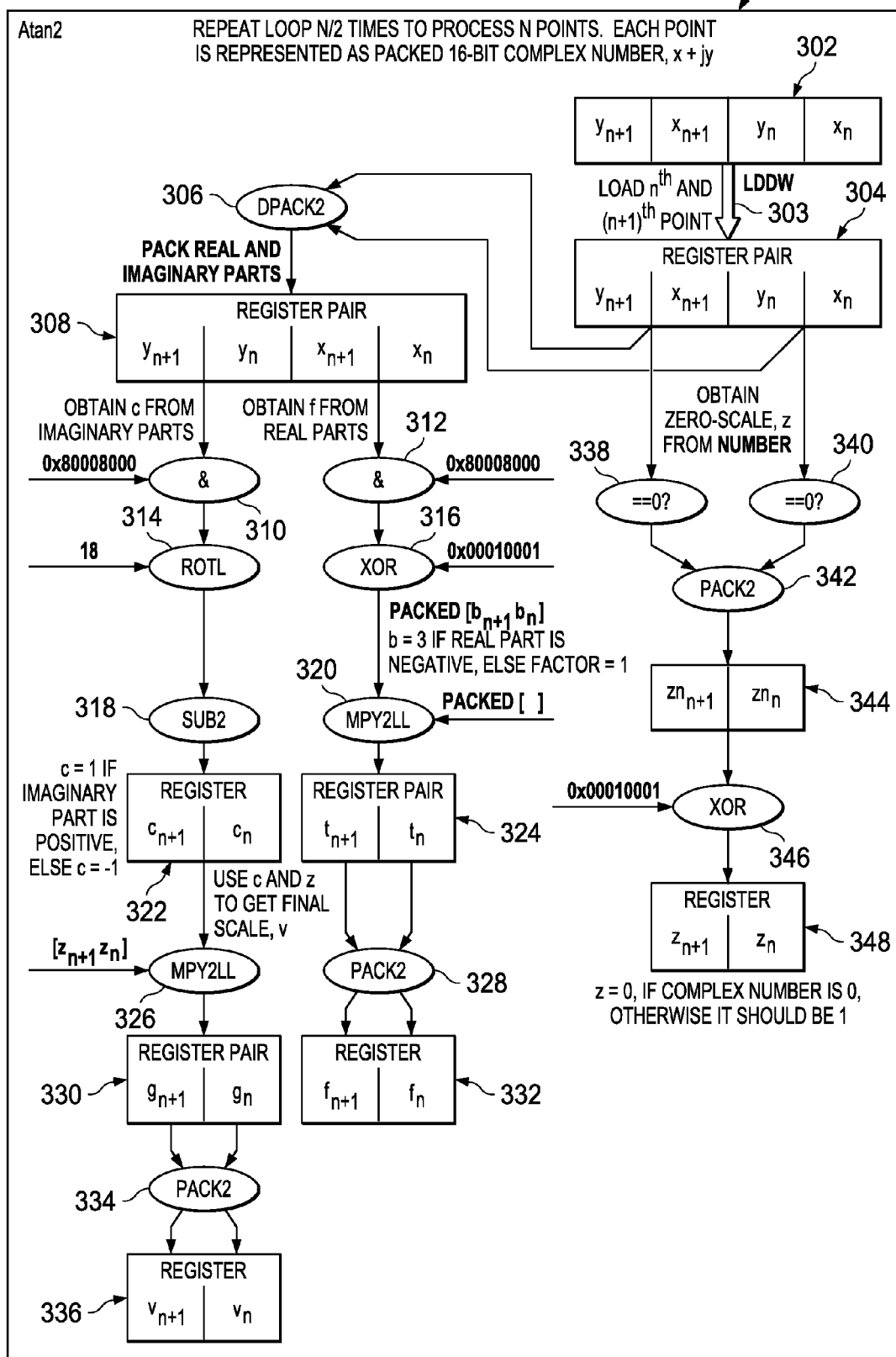
FIG. 3A-3C illustrate an A tan 2 algorithm for the DSP core architecture of FIG. 1 in accordance with an embodiment of the disclosure.
Figure 3B:
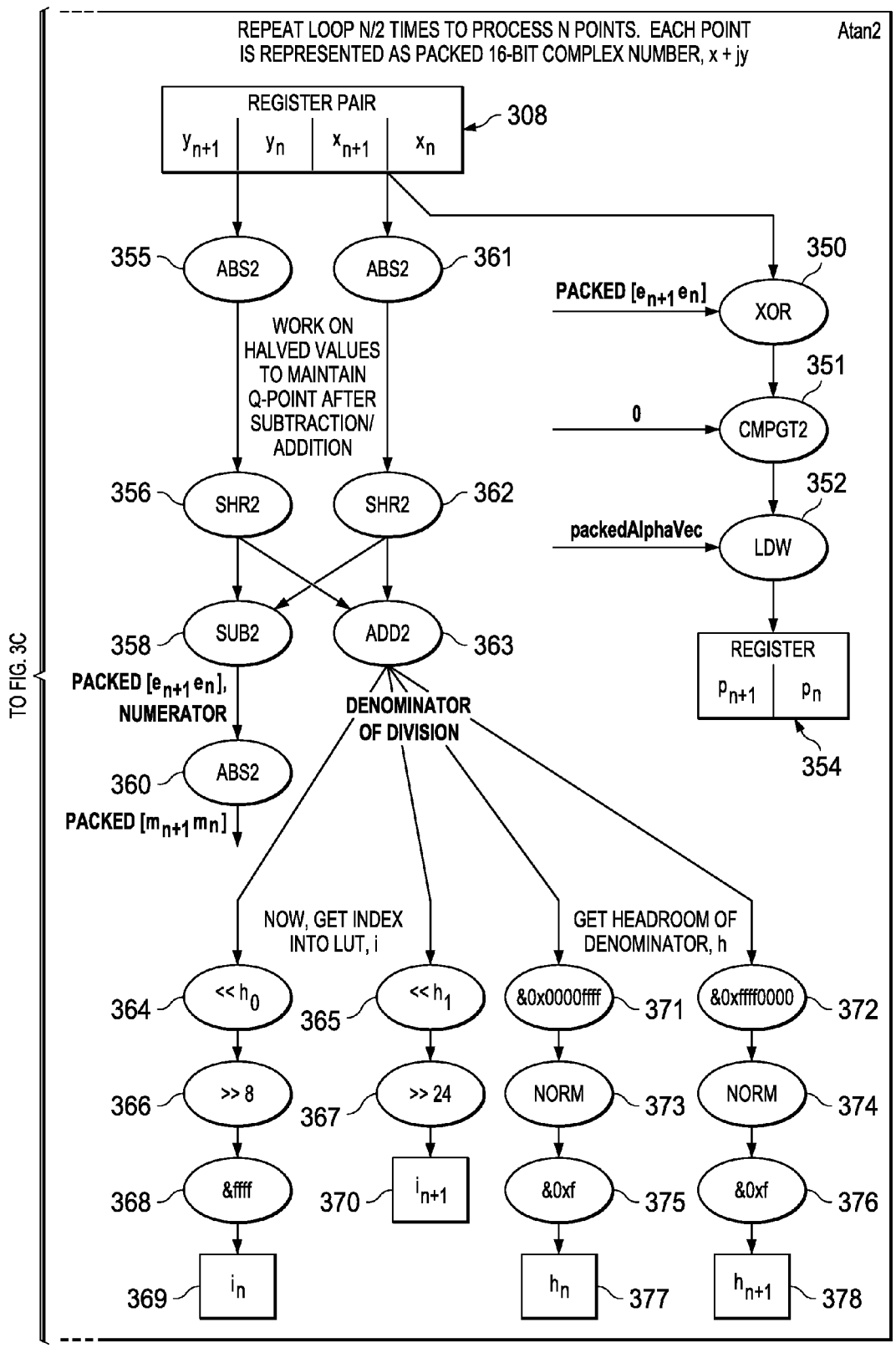
Figure 3C:
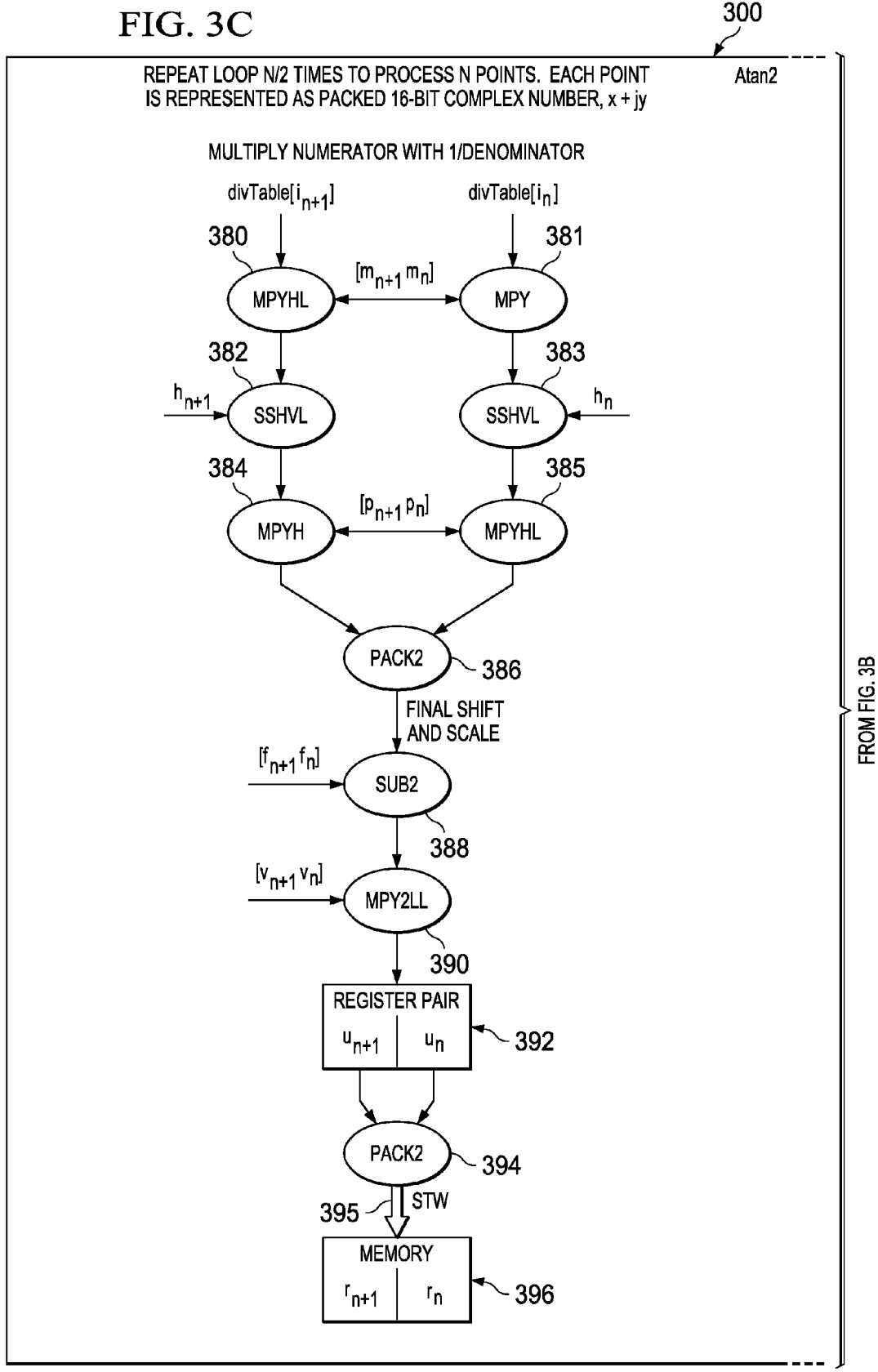

FIG. 3A-3C illustrate an A tan 2 algorithm (a tan 2_lp_16b__16b) 300 for the DSP core architecture 100 of FIG. 1 in accordance with an embodiment of the disclosure. The A tan 2 algorithm 300 operates on input complex vectors, $Z=X+jY$, where $X=\{x\}$ and $Y=\{y\}$, and computes the result, $\theta=a\tan 2(y, x)$, for each point, where $-\pi \leq a\tan 2(y,x) \leq \pi$. The resulting output is in 16 bit vector format (SQ3.13 format). In at least some embodiments, the A tan 2 algorithm 300 uses the approximation given below, $$r = \frac{x-|y|}{x+|y|}, \quad \theta = \frac{\pi}{4} - \frac{\pi}{4}r, \quad (x,y) \in Q1, (x,y) \in Q4$$

$$r = \frac{x+|y|}{|y|-x}, \quad \theta = \frac{3\pi}{4} - \frac{\pi}{4}r, \quad (x,y) \in Q2, (x,y) \in Q3$$

$$\theta = -\theta, \quad (x,y) \in Q4, (x,y) \in Q3$$

In at least some embodiments, the A tan 2 algorithm 300 implements a modified equation (shown below) instead of the equations above to avoid conditional code.

$$r = b\frac{|x|-|y|}{|x|+|y|}, \theta = a\frac{\pi}{4} - \frac{\pi}{4}r,$$

where $a = 3(x<0)$ or $1(x \geq 0)$ &

$b = 1(y \geq 0)$ or $-1(y < 0)$

In FIGS. 3A-3C, the A tan 2 algorithm 300 is repeated N/2 times to process N points. Each point is represented as a packed 16-bit complex number x+jy. As shown in FIG. 3A, points n and n+1 (block 302) are loaded to a register pair 304. In at least some embodiments, a load doubleword (LDDW) operation 303 performed by at least one D unit is used to load points n and n+1 to the register pair 304. A zero-scale (z) is obtained for points n and n+1 by operations 338 and 340, and the results are packed using a PACK2 operation performed by at least one L unit or S unit. The packed results ($zn_{n+1}$ and $zn_n$) are then stored in a register 344. In FIG. 3A, an XOR operation 346 is performed on the zero-scaled points accessed from the register 344 and the results are stored in another register 348. The XOR operation 346 is performed by at least one L unit, S unit, or D unit. The result of the XOR operation is z=0, if the complex number is zero. Otherwise, z=1.

As shown in FIG. 3A, points n and n+1 are also accessed from the register pair 304 to perform a DPACK2 operation 306 that separates the real and imaginary parts into separate registers of a register pair 308. At operation 310, c is obtained from the imaginary parts accessed from the register pair 308 and a rotate left operation (ROTL) 314 is performed. The ROTL operation 314 is performed by at least one M unit, which changes shifting operations from S units (typically used for shift operations) to M units. Thereafter, a subtract operation (SUB2) 318 is performed. The results ($c_{n+1}$ and $c_n$) of the SUB2 operation 318 are stored in a register 322. At operation 326, $c_{n+1}$ and $c_n$ are multiplied by $z_{n+1}$ and $z_n$ using an MPY2LL operation 326, performed by at least one M unit. The results ($g_{n+1}$ and $g_n$) are stored in a register pair 330. A packing operation (PACK2) 334 is performed on $g_{n+1}$ and $g_n$, which are accessed from the register pair 330, and the result ($v_{n+1}$ and $v_n$) of the PACK2 operation 334 is stored in a register 336. The PACK2 operation 334 is performed by at least one L unit or S unit.

Returning to register pair 308, a value f is obtained from the real parts stored in the register pair 308 using operation 312. An XOR operation 316 is then performed by at least one L unit, S unit, or D unit. The result of the XOR operation 316 is multiplied, using a MPY2LL operation 320, by a packed value $b_{n+1}$ and $b_n$, where b=3 if the real part is negative. Otherwise, b=1. The MPY2LL operation 320 is performed by at least one M unit. The result ($t_{n+1}$ and $t_n$) of the MPY2LL operation 320 is stored by a register pair 324. The values for $t_{n+1}$ and $t_n$ are then accessed from the register pair 324 and are packed using a PACK2 operation 328, where the PACK2 operation 328 is performed by at least one L unit or S unit. The result ($f_{n+1}$ and $f_n$) of the PACK2 operation 328 is stored in a register 332. As shown, operations 310, 314, 318, 326 are performed in parallel with operations 312, 316, 320, 328.

In FIG. 3B, the real and imaginary parts for n and n+1 are accessed from the register pair 308 for several calculations. As shown, the absolute values for the real and imaginary parts are determined by ABS2 operations 361 and 355. Further, shift right operations (SHR2) 356 and 362 are performed on the absolute value results by at least one S unit. Subtraction (SUB2) and addition (ADD2) operations 358 and 363 are then performed on the results of the shift operations 356 and 362 by at least one S unit, L unit, or D unit. The absolute value of the result (packed [$e_{n+1}$ and $e_n$] for the numerator) of the SUB2 operation 358 is determined by an ABS2 operation 360 and is referred to as "packed [$m_{n+1}$ and $m_n$]". As shown, the operations 355, 356, 358 are performed in parallel with operations 361, 362, 363.

Further, the results of the ADD2 operation 363 are shifted by operations 364, 365, 366, 367 to determine LUT indexes $i_n$ and $i_{n+1}$. The shift operations 364, 365, 366, 367 are performed by at least one S unit. The "& 0xffff" operation 368 corresponds to a bit-wise AND operation with hexadecimal number 0xffff to isolate the number represented by the least 16-bits of the input. As shown, the operations 364, 366 may be performed in parallel with the operations 365, 367 to determine $i_n$ and $i_{n+1}$. Further, the results of the ADD2 operation 363 are operated on to determine headroom values $h_n$ and $h_{n+1}$ for the denominator. The "& 0xffff0000" operation 372 allows the top 16 bits of the ADD2 operation 363 result to be isolated while the "& 0x0000ffff" operation 371 isolates the bottom 16 bits of the ADD2 operation 363 result. Once the two 16-bit numbers are isolated, the headroom on these numbers ($h_{n+1}$ and $h_n$) are determined by NORM operations 373 and 374, which return the headroom in a 32-bit input. Masking operations (& 0xf) 375 and 376 are used so that only the bottom 4 bits of the NORM result is used to determine the headroom values ($h_{n+1}$ and $h_n$). As shown, the operations 371, 373, 375 may be performed in parallel with operations 372, 374, 376 to determine $h_n$ and $h_{n+1}$.

In FIG. 3B, the real parts from register pair 308 are also XOR'd with packed values [$e_{n+1}$ and $e_n$] by operation 350. The XOR operation 350 is performed by at least one L, S, or D unit. The result of the XOR operation 350 is compared with 0 using a CMPGT2 operation 351, performed by at least one S unit. The result ($p_{n+1}$ and $p_n$) of the CMPGT2 operation 351 is loaded by LWD operation 352 to a register 354.

In FIG. 3C, numerators [$m_{n+1}$ and $m_n$] and 1/denominators (divTable[$i_{n+1}$] and divTable[$i_n$]) are multiplied using MPYHL and MPY operations 380 and 381, performed by at least one M unit. The results of the multiplication operations 380 and 381 are shifted by SSHVL operations 382 and 383, performed by at least one M unit. Subsequently, these shifted values are multiplied by $p_{n+1}$ and $p_n$ (previously determined) using MPYH and MPYHL operations 384 and 385, performed by at least one M unit. The results of the MPYH and MPYHL operations 384 and 385 are packed together by a PACK2 operation 386, performed by at least one L unit or S unit. A SUB2 operation 388 is performed on the PACK2 result by at least one L unit, S unit, or D unit, with $f_{n+1}$ and $f_n$ (previously determined) being subtracted. The results of the SUB2 operation 388 are multiplied by $v_{n+1}$ and $v_n$ using a MPY2LL operation 390, performed by at least one M unit. The results ($u_{n+1}$ and $u_n$) of the MPY2LL operation 390 are stored by a register pair 392. The values $u_{n+1}$ and $u_n$ are then accessed from the register pair 392 and are packed using a PACK2 operation 394, performed by at least one L unit or S unit. A store operation (STW) 395, performed by at least one S unit, is used to store the results ($r_{n+1}$ and $r_n$) of the PACK2 operation 394 to a memory 396. The values $r_{n+1}$ and $r_n$ are the final result of the A tan 2 algorithm 300. As shown, the operations 380, 382, 384 are performed in parallel with the operations 381, 383, 385 in the process of determining $r_{n+1}$ and $r_n$.

To summarize, several optimization techniques may be implemented when the A tan 2 algorithm 300 is mapped to the C64x+ core. For example, to facilitate use of wide load and store instructions, all input and output vectors may be aligned on 64-bit boundaries. Further, the loop may be unrolled 2 or 4 times, wide load instructions (LDW or LDDW) may be used for loading two consecutive complex numbers, and wide store instructions (STW or STDW) may be used to store the results. Further, the a tan 2(0,0) corner case needs to be handled separately and the output set to 0. To avoid conditional code, first the packed 32-bit numbers (consisting of both real and imaginary parts) are compared to 0, resulting in 1 (if both parts are zero) or 0 (if at least one of them is non-zero). The results are packed into a 32-bit register and LSBs of the upper and lower half-words are flipped (xor'd with 0x00010001) to obtain a multiplicative scale factor, z, for two consecutive complex numbers. Note that each half of z equals 1 if the inputs are non-zero, or 0 if the inputs are zero. To avoid conditional code, a modified A tan 2 equation (shown below) is implemented.

$$r = b\frac{|x|-|y|}{|x|+|y|}, \theta = a\frac{\pi}{4} - \frac{\pi}{4}r,$$

where $$a = 3(x<0) \text{ or } 1(x \geq 0) \&$$

$$b = 1(y \geq 0) \text{ or } -1(y < 0)$$

In the modified A tan 2 equation, the factor, a, is generated by masking the sign-bits (MSBs) on the upper and lower half-words of the packed real parts (x), converting to the 3 or 1 (downshifting it by 14 and adding 1). Further, the factor $$a\frac{\pi}{4}$$

is computed for two complex numbers with a single instruction by multiplying (MPY2) the results of the previous step with a register containing identical values ($\pi/4$) in the upper and lower halves. The factor, b, is generated (for two consecutive complex numbers) by first isolating the sign bits of the imaginary parts of the two numbers (by masking the MSBs of the upper and lower half-words of the packed imaginary parts), rotating the sign bits left by 18 and subtracting the sign bits from a register containing "1" in the upper and lower halves. Note that rotating the sign bits left by 18 is identical to shifting it to the right by 14 (as done for the real parts). However, rotating the sign bits left by 18 moves the computation from the M units (free during these computations) to the S units (heavily loaded during these computations). The combined factor, c=b*z, is computed for two complex numbers in parallel using the MPY2 intrinsic. The numerator and denominator are derived using |x|/2 and |y|/2 for two complex numbers in parallel, using ABS2 and SHR2 intrinsics. Note that the divide by 2 allows the Q-point of the numerator and denominator to remain same as the inputs. Beyond this the division is accomplished using the LUT approach, similar to the division algorithm 200 described previously. The final results of two numbers are scaled by a factor, c, and the results are packed and stored with wide store instructions (STW or STDW). The performance results of the A tan 2 algorithm 300 mapped to the C64x+ core were found to be 4.5 cycles (the pipelined loop kernel performance in terms of cycles per output point using C+ intrinsics code) and the NMAE (with respect to floating point implementation) was found to be less than 0.1 radians. Implementation achieves pipelined performance of 4.5 cycles/output for the C64x+ core.

Figure 4:
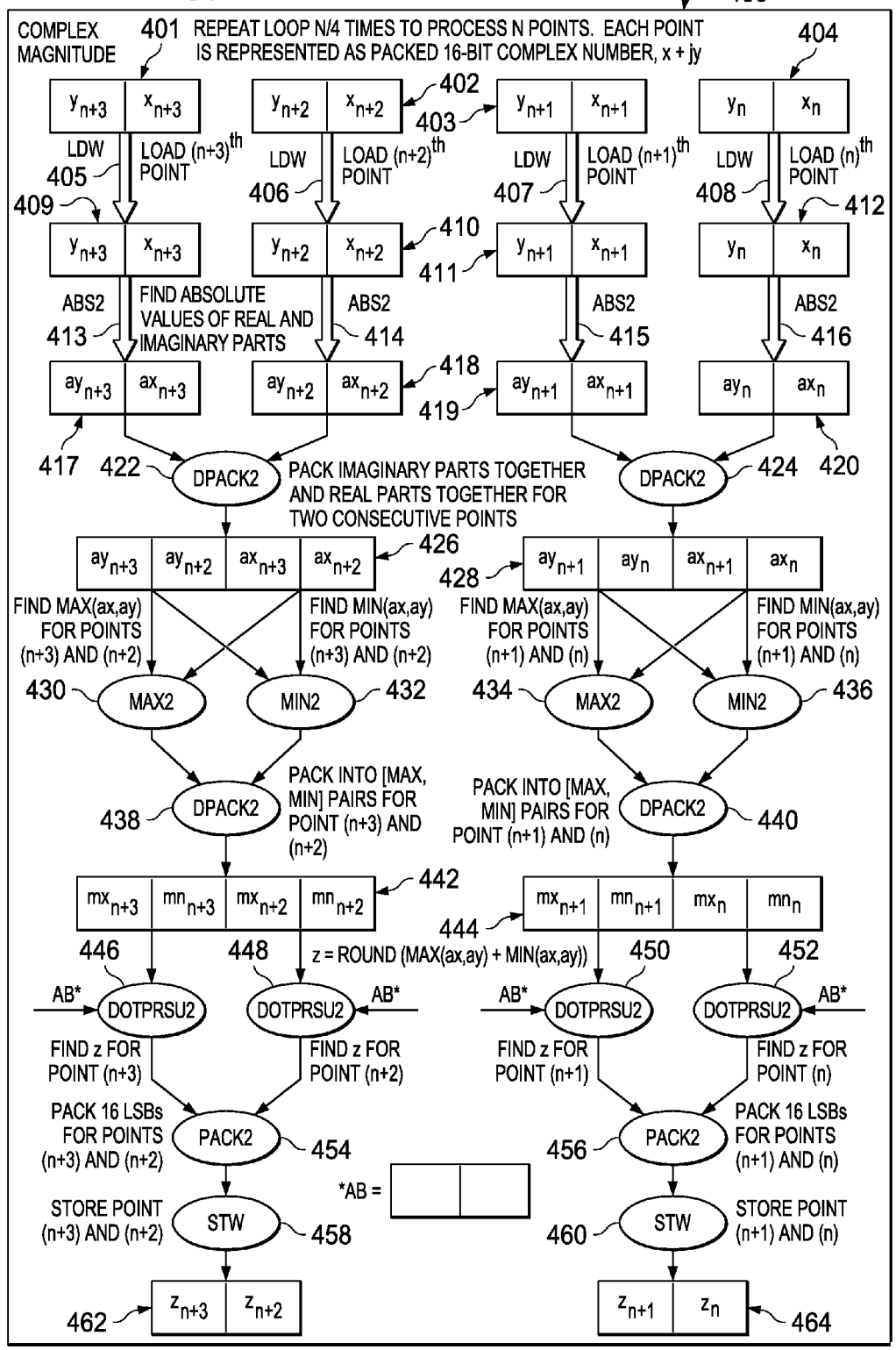
FIG. 4 illustrates a complex magnitude algorithm for the DSP core architecture of FIG. 1 in accordance with an embodiment of the disclosure.

FIG. 4 illustrates a complex magnitude algorithm (cplxMag_lp_16b_16b) 400 for the DSP core architecture 100 of FIG. 1 in accordance with an embodiment of the disclosure. The complex magnitude algorithm 400 computes the magnitude of a vector of complex numbers, X+jY, where X={x} and Y={y}. In at least some embodiments, the complex magnitude algorithm 400 approximates the value of $\sqrt{x^2+y^2}$ as $\alpha$ max(|x|, |y|)+$\beta$ min(|x|, |y|), where $\alpha$ and $\beta$ are two constants whose values are chosen to trade off among RMS error, peak error, and implementation complexity. Various possible values for the constants are known in the art. As an example, the values $\alpha$=0.947543636291 and $\beta$=0.392485425092 may be used. Alternatively, the values $\alpha$=0.960433870103 and $\beta$=0.397824734759 may be used.

In FIG. 4, the complex magnitude algorithm 400 is repeated N/4 times to process N points. Each point is represented as a packed 16-bit complex number x+jy. As shown in FIG. 4, point n+3, n+2, n+1, and n (shown as blocks 401-404) are loaded to respective registers 409-412 using LDW operations 405-408 performed by at least one D unit. The absolute values for n+3, n+2, n+1, and n are determined by respective ABS2 operations 413-416, with the results being stored in registers 417-420. As shown, each of the load operations 405-408 and each of the ABS2 operations 413-416 are performed in parallel.

The absolute values for n+3 and n+2 are accessed from registers 417, 418 and are packed using a DPACK2 operation 422, performed by at least one L unit. Similarly, the absolute values for n+1 and n are accessed from registers 419, 420 and are packed using a DPACK2 operation 424, performed by at least one L unit. As shown, the DPACK2 operations 422 and 424 are performed in parallel.

The results of the DPACK operation 422 is stored in register pair 426. As shown, a MAX2 operation 430 and a MIN2 operation 432 are performed on the contents of the register pair 426. The MAX2 operation 430 is performed by at least one L unit or S unit. Likewise, the MIN2 operation 432 is performed by at least one L unit or S unit. The results of the MAX2 operation 430 and the MIN2 operation 432 are packed using a DPACK2 operation 438, performed by at least one L unit. The results of the DPACK2 operation 438 are stored in register pair 442. The contents of the register pair 442 are accessed for DOTPRSU2 operations 446, 448, performed by at least one M unit. The results of the DOTPRSU2 operations 446, 448 are packed using a PACK2 operation 454, performed by at least one L unit or S unit. A store operation (STW) 458 is used to store the results ($z_{n+3}$ and $z_{n+2}$) of the PACK2 operation 454 in a register 462, where the STW operation 458 is performed by at least one D unit.

A similar process occurs for n+1 and n, with the results of the DPACK operation 424 being stored in register pair 428. As shown, a MAX2 operation 434 and a MIN2 operation 436 are performed on the contents of the register pair 428. The MAX2 operation 434 is performed by at least one L unit or S unit. Likewise, the MIN2 operation 436 is performed by at least one L unit or S unit. The results of the MAX2 operation 434 and the MIN2 operation 436 are packed using a DPACK2 operation 440, performed by at least one L unit. The results of the DPACK2 operation 440 are stored in register pair 444. The contents of the register pair 444 are accessed for DOTPRSU2 operations 450, 452, performed by at least one M unit. The results of the DOTPRSU2 operations 450, 452 are packed using a PACK2 operation 456, performed by at least one L unit or S unit. A store operation (STW) 460 is used to store the results ($z_{n+1}$ and $z_n$) of the PACK2 operation 456 in a register 464, where the STW operation 460 is performed by at least one D unit. As shown, the operations for determining $z_{n+3}$ and $z_{n+2}$ are performed in parallel with the operations for determining $z_{n+1}$ and $z_n$. Further, various operations (e.g., MAX2 and MIN2 operations; and DOTPRSU2 operations) are performed in parallel for each point.

To summarize, several optimization techniques may be implemented when the complex magnitude algorithm 400 is mapped to the C64x+ core. For example, to facilitate use of wide load and store instructions, all input and output vectors may be aligned on 64-bit boundaries. Further, the loop may be unrolled 2 or 4 times. Further, wide load instructions (LDW or LDDW) may be used for loading the real and imaginary parts of two numbers together, and wide store instructions (STW or STDW) may be used to store the results. Improvements may be achieved by unrolling the loop once more and using 64-bit loads and stores. Further, absolute values of two numerators and denominators values may be simultaneously found using ABS2 instructions. Further, the real parts of the two consecutive points need to be packed together followed by their imaginary parts. The DPACK2 intrinsic may be used to do the half-word shuffling. Further, the MAX2 and MIN2 intrinsics may be used on the packed output of the previous step to find maximum and minimum values of the real and imaginary parts. Note that various intrinsics can work on a pair of complex numbers in parallel. Again, the intrinsic DPACK2 may be used to pack the max and min values of each number together. Further, the intrinsic DOTPRSU2 may be used to compute $\alpha \max(|x|, |y|) + \beta \min(|x|, |y|)$ for each complex value separately. Note that the max/min values are packed as the output of the previous step. Prior to starting the loop, the values for $\alpha/2$ and $\beta/2$ can be packed together in a 32-bit register to facilitate the parallel multiple-and-add. A factor of 2 is used on the constants to prevent overflow. Further, wide aligned store instructions (STW or STDW) may be used to store the final results. The performance results of the complex magnitude algorithm 400 mapped to the C64x+ core were found to be 1 cycle (the pipelined loop kernel performance in terms of cycles per output point using C+ intrinsics code) and the NMAE (with respect to floating point implementation) was found to be less than 5%. Implementation achieves pipelined performance of 1 cycle/output for the C64x+ core.

Although various embodiments described herein are mapped to the C64x+ DSP core, it should be understood that the division algorithm 200, the A tan 2 algorithm 300, and the complex magnitude algorithm 400 may be mapped to other DSP cores. Other DSP cores may have different register sizes, different arrangement of work units (e.g., L units, D units, S units, and M units), different instruction sets, and different operations (e.g., intrinsics). In accordance with embodiments, the algorithms described herein, maximize the amount of data operated on per clock cycle. This is accomplished by filling available registers to a maximum amount, maximizing each load and store operation, and distributing operations to different work units (e.g., L units, D units, S units, and M units) to enable parallel operations.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for performing an approximate division on a digital signal processor having a plurality of registers, each register storing data of N bits, and a plurality of work units, each work unit performing data processing operations under instruction control, the steps comprising:

storing a first numerator operand of N/2 bits in a set of N/2 most significant bits of a first register of the plurality of registers;

storing a second numerator operand of N/2 bits in a set of N/2 least significant bits of the first register;

storing a first denominator operand of N/2 bits in a set of N/2 most significant bits of a second register of the plurality of registers;

storing a second denominator operand of N/2 bits in a set of N/2 least significant bits of the second register;

employing one of the work units to separately
form a first absolute value of the most significant bits of the second register and store the first absolute value in the most significant bits of a third register of the plurality of registers, and
form a second absolute value of the least significant bits of the second register and store the second absolute value in the least significant bits of the third register;

employing one of the work units to extract the first absolute value from the third register;

employing one of the work units to determine a number of unused bits in the first absolute value;

employing one of the work units to generate a headroom $h_{n+1}$ of the first denominator operand by extracting a predetermined number of bits of the number of unused bits in the first absolute value;

employing one of the work units to compute a first shift factor $s_{n+1}$ for the first denominator operand by adding the first headroom $h_{n+1}$ to a first constant and subtracting a number of fractional bits in the first denominator operand;

employing one of the work units to extract the second absolute value from the third register;

employing one of the work units to determine a number of unused bits in the second absolute value;

employing one of the work units to generate a second headroom $h_n$ of the second denominator operand by extracting a predetermined number of bits of the number of unused bits in the second absolute value;

employing one of the work units to compute a second shift factor $s_n$ for the second denominator operand by adding the second headroom $h_n$ to the first constant and subtracting a number of fractional bits in the second denominator operand;

employing one to the work units to generate a first intermediate result by left shifting the data in the third register by an amount of the first headroom $h_{n+1}$ bits;

employing one of the work units to generate a first division LUT index $i_{n+1}$ by right shifting the first intermediate by a second constant;

employing one to the work units to generating a second intermediate result by left shifting the data in the third register by an amount of the second headroom $h_n$ bits;

employing one of the work units to generating a second division LUT index $i_n$ by right shifting the first intermediate by a third constant;

employing one of the work units to generate a third intermediate result by performing an exclusive OR of data in the first register and data in the second register;

employing one of the work units to extract a most significant bit of the most significant bits of the third intermediate result;

employing one of the work units to generate a sign of a first division $m_{n+1}$ by subtracting twice the most significant bit of the most significant bits of the third intermediate result from 1;

employing one of the work units to extract a most significant bit of the least significant bits of the third intermediate result;

employing one of the work units to generate a sign of a second division $m_{n+1}$ by subtracting twice the most significant bit of the least significant bits of the third intermediate result from 1;

employing one of the work units to generate a first look-up table value by indexing a look-up table with the first division LUT index $i_{n+1}$;

employing one of the work units to generate a second look-up table value by indexing a look-up table with the second division LUT index $i_n$;

employing one of the work units to the store first look-up table value in most significant bits of a fourth register of the plurality of registers and store the second look-up table value in least significant bits of the fourth register;

employing one of the work units to generate a first product by multiplying the most significant bits of the fourth register by the most significant bits of the third register;

employing one of the work units to generate a first absolute division value by performing a saturated left shift of the first product by the headroom $h_{n+1}$;

employing one of the work units to generate a first division value by multiplying the first absolute division value by the sign of a first division $m_{n+1}$;

employing one of the work units to generate a second product by multiplying the least significant bits of the fourth register by the least significant bits of the third register;

employing one of the work units to generate a second absolute division value by performing a saturated left shift of the second product by the headroom $h_n$;

employing one of the work units to generate a second division value by multiplying the second absolute division value by the sign of a second division $m_n$; and employing one of the work units to generate a packed division by storing the first division value in most significant bits of a fifth register of the plurality of registers and storing the second division value in least significant bits of the fifth register.

2. The method of claim 1, further comprising the steps of:
employing one of the work units to round the first product by adding a first rounding value to the first product; and
employing one of the work units to round the second product by adding a second rounding value to the second product.

3. The method of claim 2, wherein:
the first rounding value is dependent upon the first shift factor $s_{n+1}$; and
the second rounding value is dependent upon the second shift factor $s_n$.

4. The method of claim 1, wherein:
N is 32;
the first constant is 23;
the second constant is 23; and
the third constant is 7.

5. The method of claim 1, wherein:
the look-up table includes a plurality of entries, each entry storing an index d and a corresponding value approximating 1/d.

6. A method of calculating an approximation of a vector magnitude of complex numbers on a digital signal processor having a plurality of registers, each register storing data of N bits, and a plurality of work units, each work unit performing data processing operations under instruction control, the steps comprising:

storing a first imaginary part operand of N/2 bits in a set of N/2 most significant bits of a first register of the plurality of registers;

storing a first real part operand of N/2 bits in a set of N/2 least significant bits of the first register;

storing a second imaginary part operand of N/2 bits in a set of N/2 most significant bits of a second register of the plurality of registers;

storing a second real part operand of N/2 bits in a set of N/2 least significant bits of the second register;

employing one of the work units to separately generate an absolute value of the first imaginary part and an absolute value of the first real part, storing the absolute value of the first imaginary part in the N/2 most significant bits of a third register of the plurality of register and storing the absolute value of the first real part in the N/2 least significant bits of the third register;

employing one of the work units to separately generate an absolute value of the second imaginary part and an absolute value of the second real part, storing the absolute value of the second imaginary part in the N/2 most significant bits of a fourth register of the plurality of register and storing the absolute value of the second real part in the N/2 least significant bits of the fourth register;

employing one of the work units to store the absolute value of the first imaginary part in a N/2 most significant bits of a fifth register of a first register pair of the plurality of registers, store the absolute value of the second imaginary part in a N/2 least significant bits of the fifth register, store the absolute value of the first real part in a N/2 most significant bits of a sixth register of the first register pair of the plurality of register and store the absolute value of the second real part in a N/2 least significant bits of the sixth register;

employing one of the work units to store a first maximum value of the absolute value the first imaginary value and the absolute value of the first real value in N/2 most significant bits of a seventh register and to store a second maximum value of the second imaginary value and the absolute value of the second real value in N/2 least significant bits of the seventh register;

employing one of the work units to store a first minimum value of the absolute value the first imaginary value and the absolute value of the first real value in N/2 most significant bits of an eighth register and to store a second minimum value of the second imaginary value and the absolute value of the second real value in N/2 least significant bits of the eighth register;

employing one of the work units to store the first maximum value in N/2 most significant bits of a ninth register of a second register pair, to store the first minimum value in N/2 least significant bits of the ninth register, to store the second maximum value in N/2 most significant bits of a tenth register of the second register pair and to store the second minimum value in N/2 least significant bits to the tenth register;

storing a first constant in N/2 most significant bits of a ninth register;

storing a second constant in N/2 least significant bits of the ninth register;

employing one of the work units to add a first product of the first maximum value and the first constant to a second product of the first minimum value and the second constant and store a sum in an eleventh register;

employing one of the work units to add a third product of the second maximum value and the second constant to a fourth product of the second minimum value and the second constant and store a sum in a twelfth register;

employing one of the work units to store N/2 most significant bits of the eleventh register into N/2 most significant bits of a thirteenth register and to store N/2 most significant bits of the twelfth register into N/2 least significant bit of the thirteenth register.

7. The method of claim 6, wherein:
the first constant is 0.947543636291; and
the second constant is 0.39248542509.

8. The method of claim 6, wherein:
the first constant is 0.960433870103; and
the second constant is 0.39782473475.

9. The method of 6, wherein:
N is 32.

* * * * *